(12) United States Patent
Reusche et al.

(10) Patent No.: US 7,791,004 B2
(45) Date of Patent: Sep. 7, 2010

(54) FLUID HEATING SYSTEM AND METHOD

(75) Inventors: Thomas K. Reusche, Elburn, IL (US);
Philip E. Chumbley, Aurora, IL (US)

(73) Assignee: Allied Precision Industries, Inc.,
Elburn, IL (US)

( * ) Notice: Subject to any disclaimer, the term of this patent is extended or adjusted under 35 U.S.C. 154(b) by 307 days.

(21) Appl. No.: 11/733,637

(22) Filed: Apr. 10, 2007

(65) Prior Publication Data
US 2007/0210068 A1   Sep. 13, 2007

Related U.S. Application Data

(63) Continuation-in-part of application No. 11/679,448, filed on Feb. 27, 2007, now Pat. No. 7,423,243.

(60) Provisional application No. 60/779,168, filed on Mar. 3, 2006, provisional application No. 60/779,504, filed on Mar. 6, 2006.

(51) Int. Cl.
*H05B 1/02* (2006.01)
*F25B 29/00* (2006.01)

(52) U.S. Cl. .................. 219/494; 219/437; 219/438; 219/441; 219/442; 219/448.11; 219/448.12; 219/448.14; 219/448.15; 219/482; 219/493; 219/509; 219/510; 165/254; 165/64; 165/80.4; 165/100; 165/206; 165/261; 165/263; 165/294

(58) Field of Classification Search .................. 219/494, 219/437, 438, 441–2, 447.1, 448.11, 448.12, 219/448.14, 448.15, 482–93, 509–10; 165/64, 165/80.4, 100, 206, 254, 261, 263, 294
See application file for complete search history.

(56) References Cited

U.S. PATENT DOCUMENTS 2,877,051 A    3/1959 Cushman
(Continued)

FOREIGN PATENT DOCUMENTS

DE    196 45 970    5/1998
(Continued)

*Primary Examiner*—Shawntina Fuqua
(74) *Attorney, Agent, or Firm*—McAndrews, Held & Malloy, Ltd.

(57) ABSTRACT

A fluid heating system configured to regulate a temperature of a fluid within a fluid receptacle having a fluid reservoir includes a processing unit, at least one fluid temperature sensor in electrical communication with the processing unit, and a heating element in electrical communication with the processing unit. The at least one fluid temperature sensor is configured to detect a temperature of one or both of the fluid receptacle and/or fluid retained within the fluid receptacle. The processing unit selectively activates and deactivates the heating element to regulate the temperature of the fluid within the fluid receptacle.

23 Claims, 8 Drawing Sheets

U.S. PATENT DOCUMENTS

| | | | |
|---|---|---|---|
| 3,836,130 A | | 9/1974 | Earhart |
| 4,166,086 A | | 8/1979 | Wright |
| 4,599,973 A | | 7/1986 | Ward |
| 5,299,424 A | * | 4/1994 | Woodson et al. .............. 62/3.7 |
| 5,303,585 A | | 4/1994 | Lichte |
| 5,336,399 A | | 8/1994 | Kajisono |
| 5,392,380 A | * | 2/1995 | Tsai ........................... 392/498 |
| 5,980,100 A | | 11/1999 | Haegeman |
| 6,125,696 A | | 10/2000 | Hannan |
| 6,484,666 B1 | | 11/2002 | Reusche |
| 6,597,863 B2 | | 7/2003 | Koskey, Jr. |
| 6,640,747 B2 | | 11/2003 | Reusche |
| 6,909,842 B2 | * | 6/2005 | Dufour ....................... 392/447 |
| 2005/0121645 A1 | | 6/2005 | Prescott |
| 2006/0096971 A1 | | 5/2006 | Resuche |
| 2006/0249505 A1 | | 11/2006 | Resuche |
| 2006/0289466 A1 | | 12/2006 | Reusche |
| 2006/0289467 A1 | | 12/2006 | Reusche |

FOREIGN PATENT DOCUMENTS

| | | |
|---|---|---|
| WO | WO 98/57132 | 12/1998 |
| WO | WO 2006/026624 | 9/2006 |

\* cited by examiner

FLUID HEATING SYSTEM AND METHOD

RELATED APPLICATIONS

The present application is a continuation-in-part of U.S. application Ser. No. 11/679,448, entitled "Heating System and Method," filed Feb. 27, 2007, which claims priority from the following: (a) U.S. Provisional Application No. 60/779,168, entitled "Microprocessor Control of Heated Pet Mats, Beds, and Blankets," filed Mar. 3, 2006, which is hereby incorporated by reference in its entirety; and (b) U.S. Provisional Application No. 60/779,504, entitled "Microprocessor Control of Heated Birdbaths," filed Mar. 6, 2006, which is also hereby incorporated by reference in its entirety.

The present application also relates to and claims priority from U.S. Provisional Application No. 60/791,341, entitled "Microprocessor Controlled Bucket Heater," filed Apr. 12, 2006, which is also hereby incorporated by reference in its entirety.

BACKGROUND OF THE INVENTION

Embodiments of the present invention generally relate to a heating system and method, and more particularly to a system and method of heating a fluid within a fluid receptacle, such as water within a bucket.

In various applications, it is desirable to maintain a steady water temperature within a relatively small container. For example, a plasterer may use warm water to mix with plaster in order to easily dissolve the plaster and improve its adhesion. Also, a bucket of varnish for floor finishing may be placed in a warm water bath in order to vary the viscosity of the varnish. Additionally, one may desire to use warm water when washing an automobile due to the fact that the warm water may be more comfortable to the touch.

With respect to the applications discussed above, fluid may be heated by simply using hot tap water. In most cases, however, the fluid is initially heated and then removed from the heat source, at which time the fluid begins to cool. Thus, the water may remain within the desired temperature range for only a short period of time.

Submersible heaters may be used to continually add heat to the water. Such heaters are often set at a predetermined wattage and are typically monitored to ensure that fluid within a receptacle is not overheated. Additionally, typical submersible heaters are not the safest devices for heating fluid. In particular, the electrical components of the submersible heaters may come into contact with the fluid.

Heated buckets may also be used to heat fluid contained therein. Heated buckets advantageously separate the heating element, and therefore the electrical components, from the fluid. As such, heated buckets are typically safer than submersible heaters.

A typical heated bucket, however is configured so that it continually heats whenever the heating element is plugged in. Temperature control may be achieved through the use of a thermostat that monitors fluid temperature and disengages power to the heating element whenever a preset temperature is reached. While thermostats may provide satisfactory control for some applications, they typically do not provide tight temperature control around a set point due to operational hysteresis. For example, mechanical thermostats are typically specified with an uncertainty in the activation/deactivation temperatures up to 7° F. A thermostat selected to activate at 40° F. may actually activate at 33° F.

Some heaters employ a variable thermostat in which the heat range may be adjusted. The adjustment process typically is not correlated to the actual fluid temperature, however.

Thus, a need exists for safe and efficient system and method of heating fluid within a fluid receptacle, such as a bucket.

SUMMARY OF THE INVENTION

Certain embodiments of the present invention provide a fluid heating system configured to regulate a temperature of a fluid, such as water, within a fluid reservoir of a fluid receptacle. The system includes a processing unit, at least one temperature sensor, and a heating element, such as a conductive heating rod or coil.

The fluid temperature sensor(s) are in electrical communication with the processing unit, and are configured to detect a temperature of one or both of the fluid receptacle and/or fluid retained within the fluid receptacle.

The heating element is also in electrical communication with the processing unit, and is configured to heat one or both of the fluid receptacle and/or fluid retained within the fluid receptacle. The processing unit selectively activates and deactivates the heating element to regulate the temperature of the fluid within the fluid receptacle.

The system may also include at least one adjustment member, such as a button, switch, slider, dial, or the like, in electrical communication with the processing unit. The adjustment member(s) are configured to allow an input of a desired fluid temperature, wherein the processing unit selectively activates and deactivates the heating element based on the input desired fluid temperature. The system may also include a readout screen, such as a digital video screen, in electrical communication with the processing unit. The processing unit may be operable to display the temperature of the fluid on the readout screen.

A switch may be disposed between the processing unit and the heating element. The processing unit may selectively activate and deactivate the heating element through the switch. The switch may be a semiconductor switch, such as a triac, and/or a relay.

The system may include a plurality of fluid temperature sensors disposed along or proximate a length of the heating element. The plurality of fluid temperature sensors may be configured to detect temperature gradients within the fluid receptacle and/or the fluid retained within the fluid receptacle.

The heating element may be configured to be positioned within the fluid reservoir. Optionally, the heating element and the processing unit may be incorporated into the fluid receptacle such that both are secured to or within the fluid receptacle, and the heating element surrounds at least a portion of the fluid receptacle.

The system may also include at least one heating element temperature sensor in communication with the processing unit, wherein the processing unit is configured to prevent the heating element from activating based on a temperature of the heating element. The system may also include at least one fluid level sensor in communication with the processing unit, wherein the processing unit is configured to prevent the heating element from activating based on a fluid level within the fluid reservoir.

Figure 1:
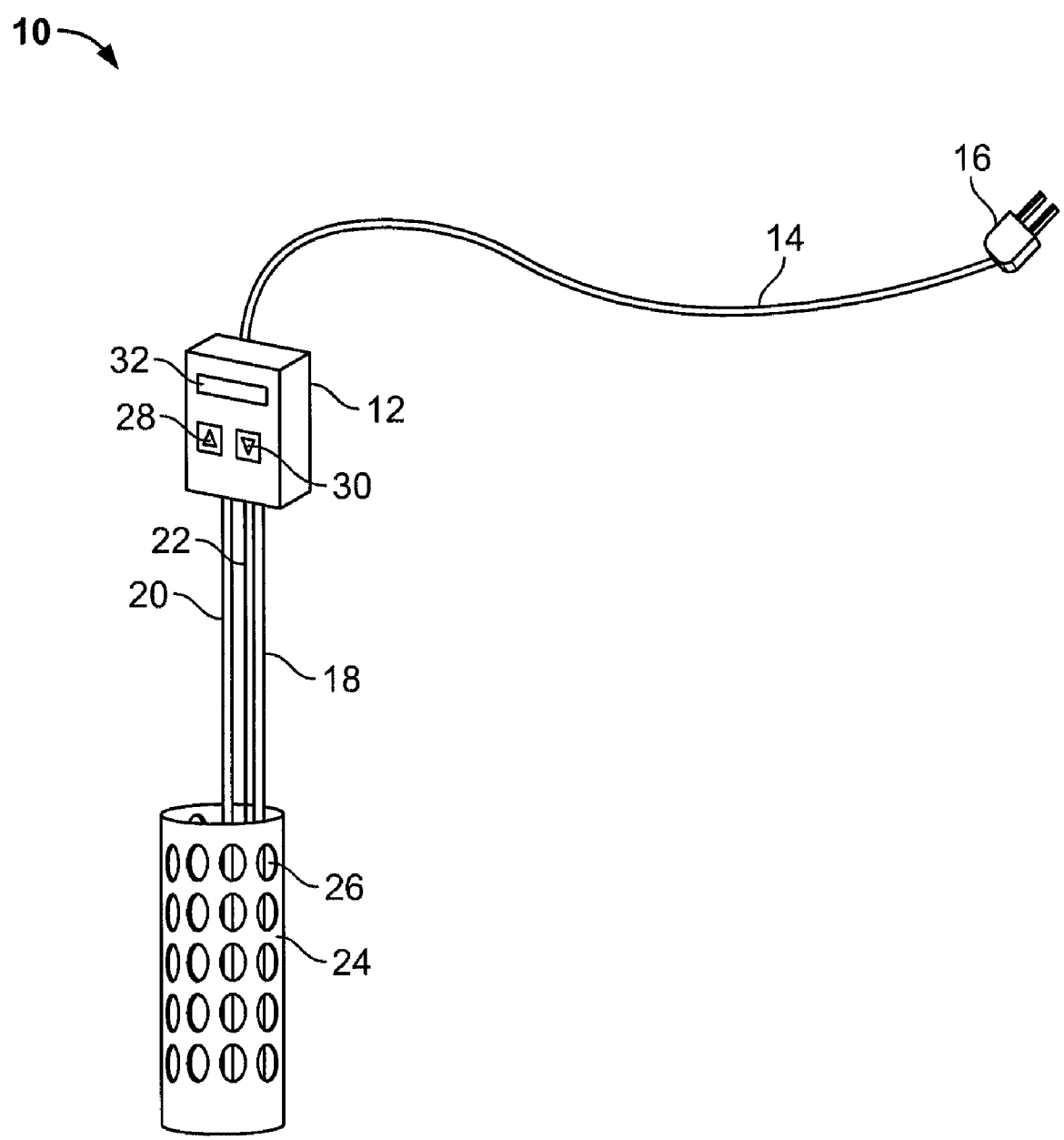
FIG. 1 illustrates an isometric view of a fluid heating system configured to be used with a fluid receptacle according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric view of a fluid heating system 10 configured to be used with a fluid receptacle, such as a water bucket, according to an embodiment of the present invention. The fluid heating system 10 is configured to regulate the temperature of fluid retained within a fluid receptacle based on user defined parameters or inputs.

The fluid heating system 10 includes a control housing 12 electrically connected to a power cord 14 having an electrical plug 16 that is configured to electrically connect to a standard AC outlet (not shown). Optionally, the fluid heating system 10 may be battery operated.

A heating element 18 is electrically connected to the control housing 12 and downwardly extends from the control housing 12. The heating element 18 may include one or more conductive rods and/or coils. The heating element 18 is preferably configured to be electrically isolated from fluid, such as water, within a fluid receptacle through a calorimetric rod.

Additionally, at least one temperature sensor 20 is electrically connected to the control housing 12. The temperature sensor(s) 20 may be positioned within a tube 22 that downwardly extends from the control housing 12. The temperature sensor(s) 20 may be thermistors or thermocouples that provide input to a processing unit within the control housing 12. The temperature sensor(s) 20 are used to monitor fluid temperature within a fluid receptacle and over-temperature conditions of the heating element 18.

A circumferential guard sleeve 24 surrounds at least a portion of the heating element 18 and the tube 22. The guard sleeve 24 may be formed of plastic, rubber, or the like, and includes a plurality of openings 26 that are configured to allow fluid to pass through the sleeve 24. The guard sleeve 24 may mount to the heating element 18 and the tube 22 through a snapable connection, or it may be secured to the heating element 18 and/or the tube 22 through a fastener, such as a screw, bolt, or the like. The guard sleeve 24 protects the heating element 18 from coming into direct contact with walls of the fluid receptacle or objects contained within the fluid receptacle.

The control housing 12 contains a processing unit (not shown in FIG. 1) such as a microprocessor, and a triac or relay (not shown in FIG. 1). The processing unit and the triac or relay operate to control the heating element 18. The control housing 12 also includes adjustment buttons 28 and 30 that allow a user to vary the heat applied to fluid within the fluid receptacle. As an alternative to buttons 28 and 30, the system 10 may utilize sliders, switches, dials, keypads, or the like to allow a user to interface with the control housing 12 in order to adjust the desired fluid temperature. Additionally, the control housing 12 also includes a readout screen 32 or window that provides real time temperature readouts.

The system 10 may also include fluid sensors (not shown in FIG. 1) that are configured to detect the presence of fluid within the fluid receptacle. The fluid sensors may be used to prevent the heating element 18 from being activated unless fluid is present within the fluid receptacle. For example, the fluid sensors are in electrical communication with the processing unit within the control housing 12. Signals from the fluid sensors are sent to the processing unit. If the processing unit determines that there is no fluid within the fluid receptacle, based on the signals received from the fluid sensors, the processing unit operates to prevent the heating element 18 from activating. An exemplary fluid sensor is shown and described in United States Patent Application Publication 2006/0042376, entitled "Liquid Level Sensor," published Mar. 2, 2006.

In operation, the system 10 is positioned with respect to a fluid receptacle such that the heating element 18 and the temperature sensor(s) 20 are positioned within a fluid receptacle, such as a water bucket. The temperature sensor(s) 20 detect the temperature of the fluid within the fluid receptacle and relay the detected temperature to the processing unit. The processing unit operates to display the temperature of the fluid on the screen 32. A user may then engage the buttons 28 and 30 to change the temperature of the fluid. If the user desires to increase the temperature of the fluid, the processing unit operates to activate the heating element 18 until the desired temperature is reached. Once the temperature of the fluid reaches the desired temperature, the processing unit deactivate the heating element 18. Electrical power to the heating element 18 is switched by the triac or relay, which is controlled by the processing unit.

Figure 2:
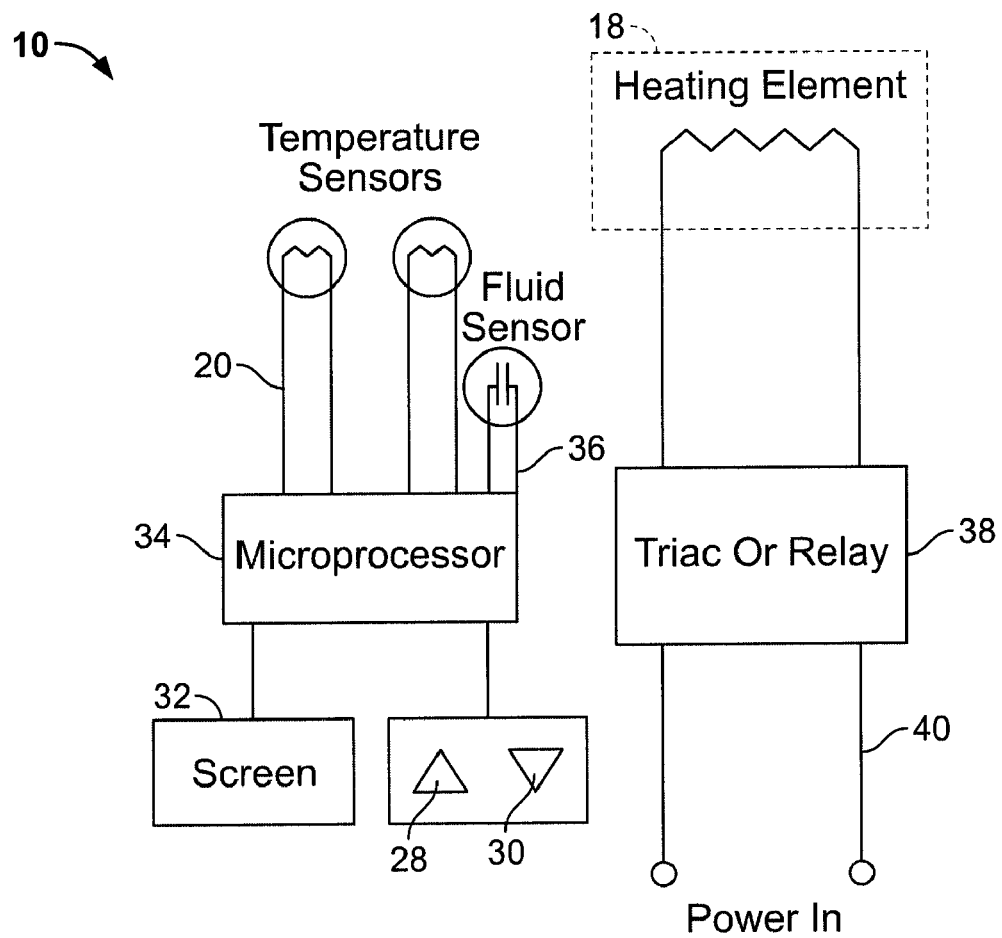
FIG. 2 illustrates a schematic representation of a fluid heating system according to an embodiment of the present invention.

FIG. 2 illustrates a schematic representation of the fluid heating system 10 according to an embodiment of the present invention. As discussed above, the fluid heating system 10 includes a processing unit 34 (such as a microprocessor, microcontroller, an integrated circuit, such as an application specific integrate circuit (ASIC), or any other such electronic controller) electrically connected to the temperature sensor(s) 20. The processing unit 34 may also be electrically connected to at least one fluid sensor 36. As also noted above, the screen 32 and the adjustment buttons 28 and 30 are also in electrical communication with the processing unit 34.

The processing unit 34 is, in turn, electrically connected to the heating element 18 shown and described in FIG. 1. A power switch 38, such as a semiconductor switch (e.g., a triac) and/or relay, may be disposed within the electrical path between the processing unit 34 and the heating element 18. A power source 40, such as a standard wall outlet, is electrically connected to the switch 38 through the power cord 14 (shown in FIG. 1). The processing unit 34 activates or deactivates the switch 38 in order to selectively energize/de-energize the heating element 18 depending on the temperature detected by the temperature sensor(s) 20 and relayed to the processing unit 34. Additionally, the processing unit 34 may prevent the switch 38 from activating the heating element 18 if the fluid sensor(s) 36 detect that no fluid is present within the fluid receptacle.

As noted above, the fluid heating system 10 may be used with a fluid receptacle, such as a water bucket, to control the temperature of water within the receptacle. Turning now to the thermodynamic properties of water, the amount of heat required to raise the temperature of a body of water by a certain amount is given by equation (1):

$$\Delta Q = Mc\Delta T \qquad (1)$$

where $\Delta Q$ is the amount of heat required, M is the mass of the body of water, c is the specific heat of the water, and $\Delta T$ is the change in temperature. Differentiating equation (1) with respect to time (t) gives equation (2):

$$dQ/dt = Mc(dT/dt) \qquad (2)$$

The heat quantity dQ/dt is the rate of heat flow, H, so equation (2) can then be written as:

$$H = Mc(dT/dt) \qquad (3)$$

Figure 3:
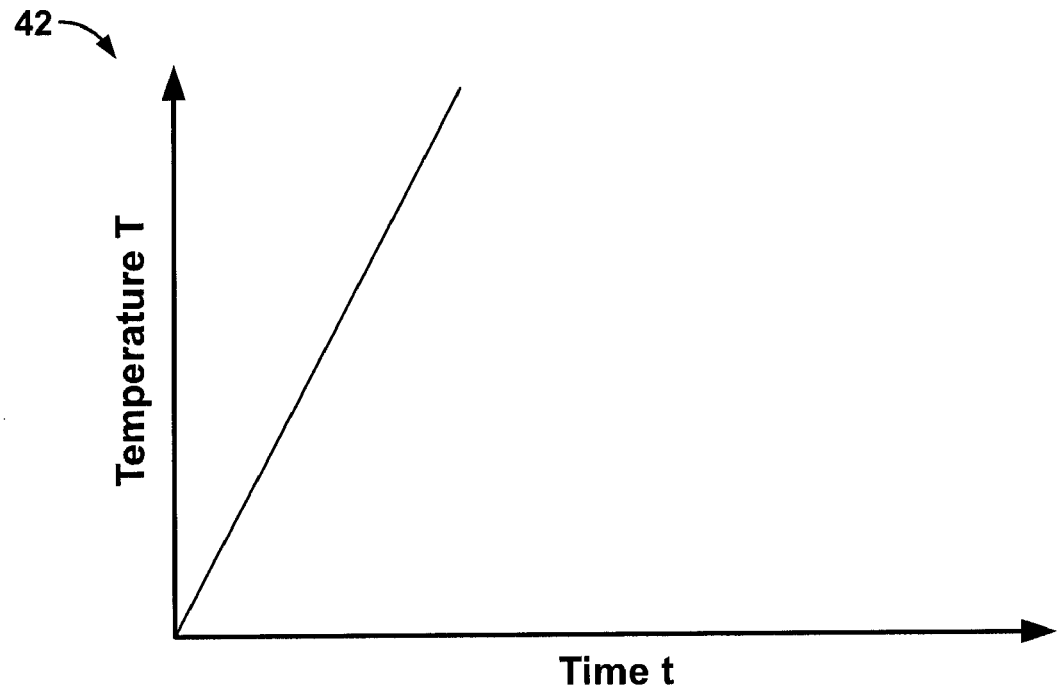
FIG. 3 illustrates a graph of the temperature of a body of water over time when there is no heat loss.

Thus, for a given value of H, as shown by equation (3), the rise in temperature is linear over time. FIG. 3 illustrates a graph 42 of the temperature of a body of water over time when there is no heat loss.

Similarly, for heat transfer through a material, the rate of heat flow is given by equation (4):

$$H = -kA(dT/dx) \qquad (4)$$

where H is the rate of heat flow, k is the thermal coefficient of the material, A is the cross-sectional area of the thermal path, and (dT/dx) is the rate of temperature change with regard to distance along the material. For a material of thickness X between two temperatures of $T_1$ and $T_2$, the heat flow is given by equation (5):

$$H = -kA(T_2 - T_1)/X = -kA(\Delta T)/X \qquad (5)$$

From equation (5) it is seen that, as $T_1$ approaches $T_2$, $\Delta T$ decreases and the rate of heat flow H decreases. In other words, the flow of heat from one side of the material to the other side slows down.

Figure 4:
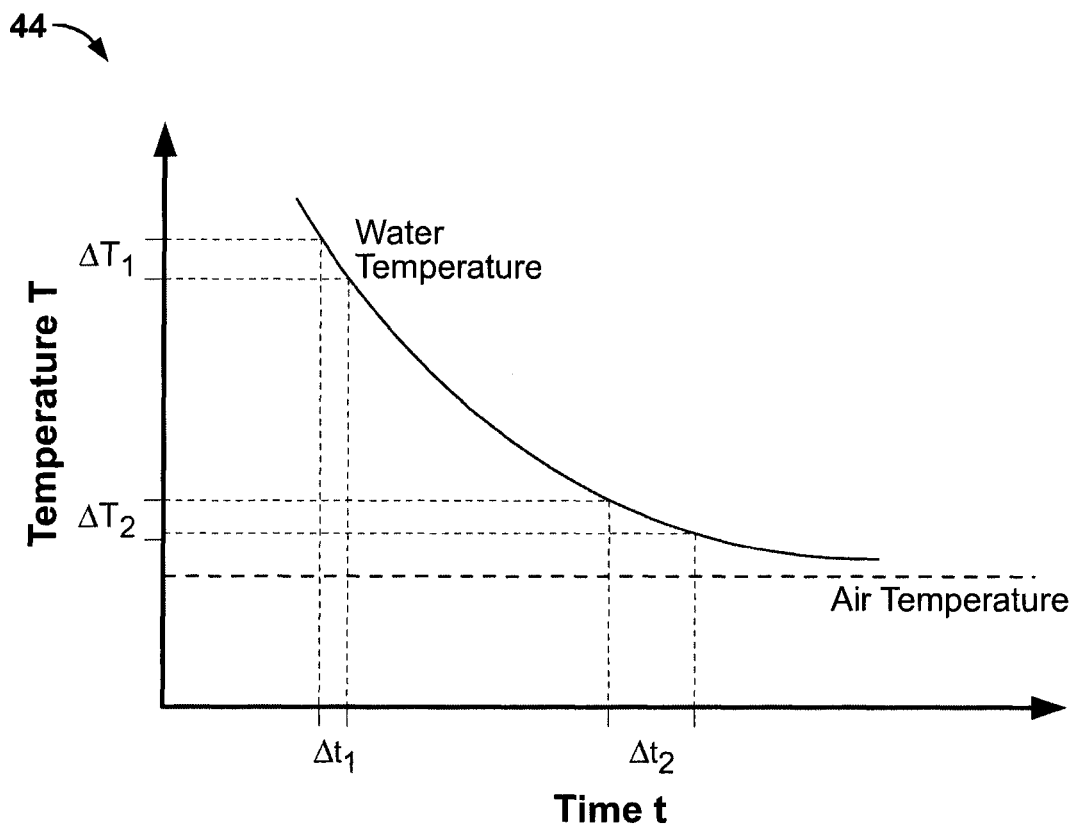
FIG. 4 illustrates a graph of the temperature of a body of water over time as heat is lost to the air.

FIG. 4 illustrates a graph 44 of the temperature of a body of water over time as heat is lost to the air. As shown in FIG. 2, $\Delta T_1$ is the same temperature difference as $\Delta T_2$, however, $\Delta T_1$ occurs at a higher temperature above the air temperature. The corresponding change in time for $\Delta T_1$ is $\Delta t_1$. The corresponding change in time for $\Delta T_2$ is $\Delta t_2$. Even though, as mentioned, the magnitudes of $\Delta T_1$ and $\Delta T_2$ are equal, the corresponding change in time for $\Delta T_1$ (i.e., $\Delta t_1$) is shorter than for the corresponding change in time for $\Delta T_2$ (i.e., $\Delta t_2$). That is, $\Delta t_2$ is greater than $\Delta t_1$. Thus, as the temperature of the water approaches the temperature of the air, the rate at which heat is lost decreases.

Figure 5:
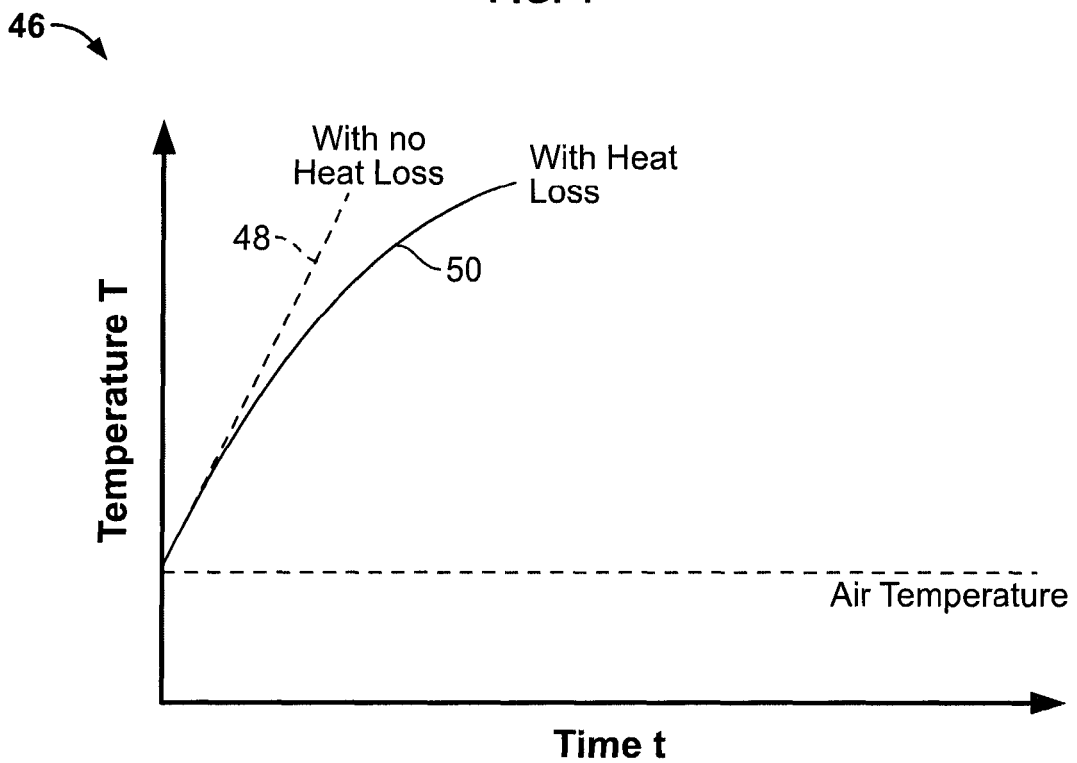
FIG. 5 illustrates a graph of the effect over time of heat loss on a body of water as heat is introduced into the water.

FIG. 5 illustrates a graph 46 of the effect over time of heat loss on a body of water as heat is introduced into the water. As discussed above, according to equation (3), as the water is heated, the temperature of the water 48 without accounting for heat loss to the air is linear. However, as discussed above, heat is lost to the air. Thus, the temperature of the water 50 accounting for heat loss to the air is not linear, because heat is lost at a faster rate as the temperature of the water rises above the temperature of the air.

Figure 6:
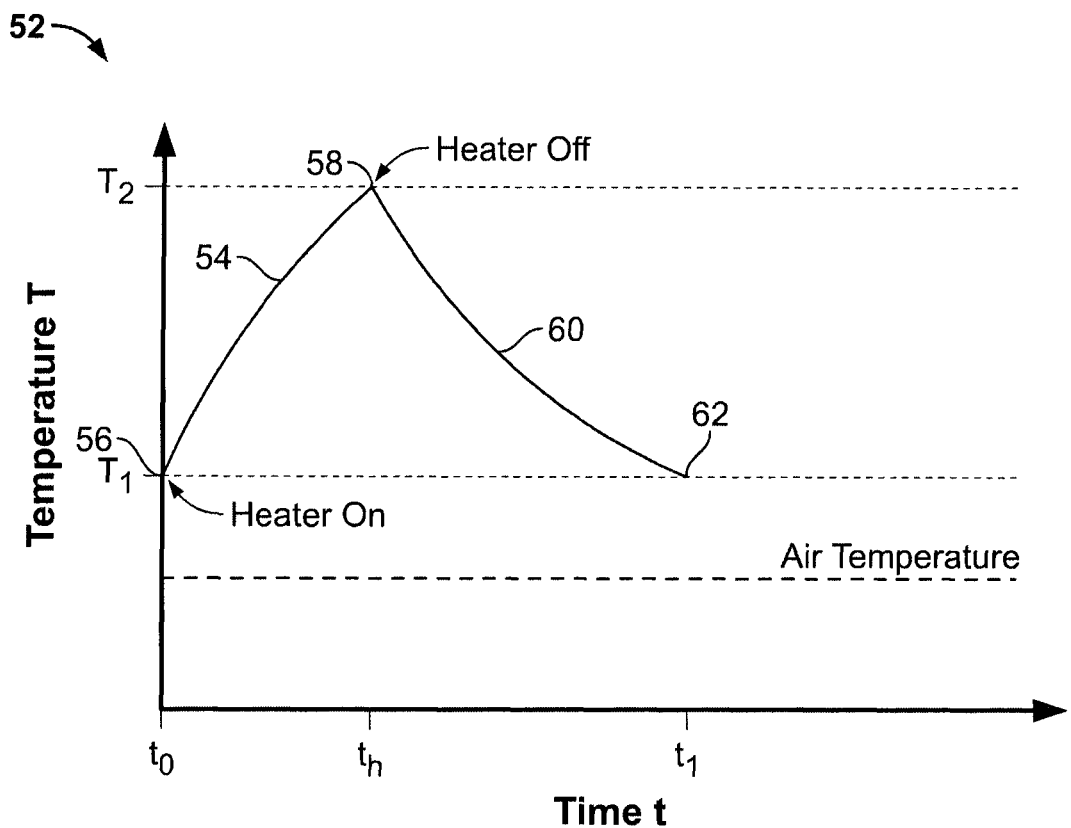
FIG. 6 illustrates a graph of the temperature of a body of water over time.

FIG. 6 illustrates a graph 52 of the temperature of a body of water over time. More particularly, FIG. 6 illustrates the temperature of the body of water 54 as it is heated, starting from a temperature $T_1$ until the temperature reaches a temperature $T_2$. The water is heated beginning at time $t_0$ 56 until time $t_h$ 58. The temperature of the water then cools 60 from temperature $T_2$ to temperature $T_1$ because the air temperature is below both temperatures $T_2$ and $T_1$. The amount of time for one cycle is $t_1$ 62, when the temperature returns to the activation temperature from which the cycle started.

Figure 7:
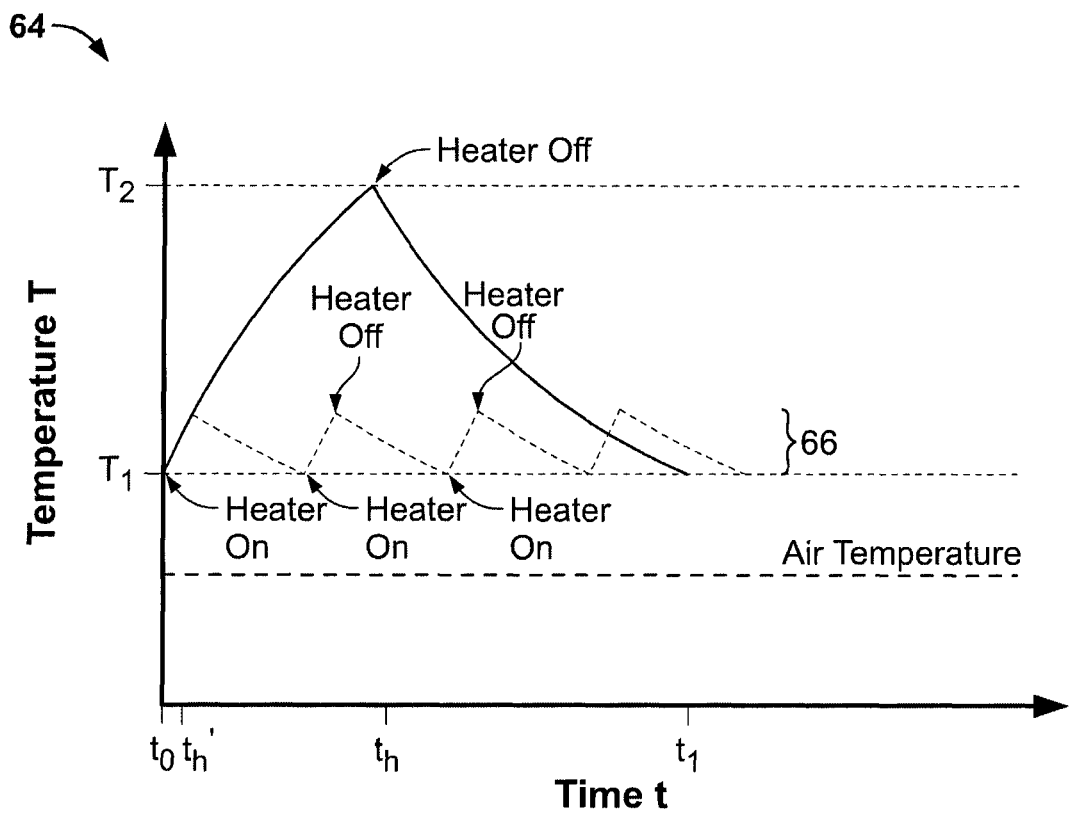
FIG. 7 illustrates a graph of the temperature of a body of water over time.

FIG. 7 illustrates a graph 64 of the temperature of a body of water over time. More particularly, FIG. 7 superimposes four heating cycles 66 over the graph 52 shown in FIG. 6. The heating cycles 66 heat the body of water to a temperature that is only 20% of $T_2$. The four heating cycles 66 take approximately the same time for the one cycle illustrated in FIG. 6, $t_1$. However, the four heating cycles 66 take advantage of the property discussed above, that the heat loss for each cycle in the four heating cycles 66 is slower relative to the heat loss 62 in the cycle from FIG. 6. Further, the temperature rise for time $t_h'$ is the steepest, and therefore most efficient, portion of the heating curve for the four heating cycles 66. Thus, the water temperature is cycled through a range in which it is heated the quickest and cools off the slowest. Therefore, the heater is on for less time in the four heating cycles 66.

As illustrated in FIG. 7, the amount of time to go through one cycle ($t_1$) of the heating/cooling period illustrated in FIG. 6 is approximately 3.7 cycles of the heating/cooling at the lower temperature. Thus, the amount of time that the heater is turned on for one of the heating cycles in the four heating cycles 66, $t_h'$, is only 12.5% of the original time $t_h$. Multiplying this figure by 3.7 gives 46.25%. Thus, while the water temperature is still maintained at or above $T_1$, decreasing the temperature range by 20% results in an improvement in efficiency of over 50%.

Referring again to FIGS. 1-2, the processing unit 34 may activate the switch 38 to complete a circuit to the heating element 18. When the switch 38 is activated, the heating element 18 energizes. The temperature sensor(s) 20 monitor the temperature of the water within the fluid receptacle, while the fluid sensor(s) 36 monitor the level of fluid within the fluid receptacle. The resolution of the temperature sensor(s) 20 may be selected to be on the order of 1° F. The processing unit 34 is configured to energize the heating element 18 based on the desired temperature input through the adjustment buttons 28 and 30 and the temperature of the fluid within the fluid receptacle detected by the temperature sensor(s) 20.

For example, an operator selects a desired fluid temperature and enters it into the control housing 12 through the adjustment buttons 28 and/or 30. The temperature of the fluid within the fluid receptacle, as detected by the temperature sensor(s) 20, may be displayed on the screen 32. Once the operator selects the desired fluid temperature, the processing unit 34 sets the target temperature based on the input desired fluid temperature. The processing unit 20 then activates the heating element 18 to heat the fluid within the fluid receptacle to the target temperature as detected by the temperature sensor(s) 20. When the processing unit 34 determines that the temperature of the fluid is at the target temperature, as detected by the temperature sensor(s) 20, the processing unit 34 may deactivate the heating element 18.

When the temperature sensor(s) 20 detect the temperature of the water within the fluid receptacle to be outside of a selected margin of difference from the target temperature (e.g., 1 degree), the processing unit 34 may activate the switch 38 to energize the heating element 18. When the temperature of the fluid within the fluid receptacle once again reaches the target temperature, the processing unit 34 deactivate the heating element 18, and the process repeats.

Alternatively, instead of using a separate switch 38, the processing unit 34 may be directly connected to the heating element 18, without the switch 38 therebetween. Thus, the processing unit 34 may directly activate and deactivate the heating element 18 based on the target temperature, and the temperatures detected by the temperature sensor(s) 20 and relayed to the processing unit 34.

Each temperature sensor 20 may be a thermistor, thermometer, resistance temperature detector, or other such component that creates a signal that may be measured electronically as a function of temperature. Because the accuracy of the temperature sensor(s) 20 is much greater than that of mechanical thermostats, the water temperature may be controlled through a much smaller temperature range. Thus, the efficiency of the heating element 18 is increased.

The resolution of electronic temperature sensors is typically tenths of a degree compared to several degrees for a conventional thermostat. As such, the processing unit 34 is able to closely monitor and control the temperature of fluid within the fluid receptacle. Additionally, embodiments of the present invention may utilize several temperature sensors positioned along or proximate the height of the submerged heating element 18. In such a configuration, the multiple temperature sensors are able to sense temperature gradients of the fluid. The processing unit 34, upon receiving the temperature gradient readings, operates to adjust the amount of heat introduced into the fluid (which contrasts sharply to a single mechanical thermostat that only monitors the temperature at one point).

Embodiments of the present invention provide a fluid heating system that offers flexible heat control. An operator may program the processing unit 34 to activate and deactivate the heating element 18 at different temperatures. For example, the operator may want the heating element 18 to activate whenever the fluid temperature cools to a certain temperature, but then to remain activated until the fluid temperature reaches a higher temperature and then maintain the fluid temperature at that point. The processing unit 34 may be configured to allow the operator to select an "ON" or "ACTIVATION" temperature and a "FINAL" temperature. The processing unit 34 may also be programmed to ramp the rate of heating at a desired rate. Thus, an operator may program the processing unit 34 to heat fluid within the fluid receptacle from a first temperature to a second temperature within a desired timeframe.

Figure 8:
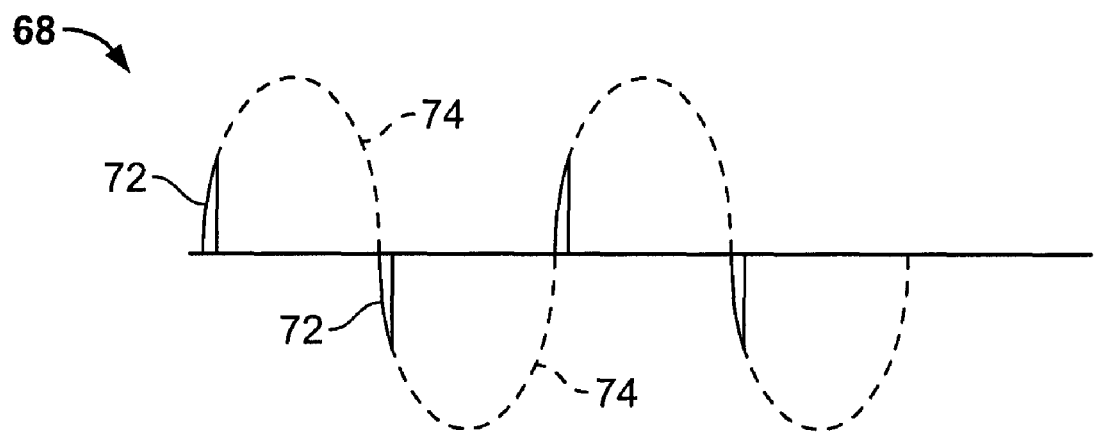
FIG. 8 illustrates a duty cycle for a heating element according to an embodiment of the present invention.
Figure 9:
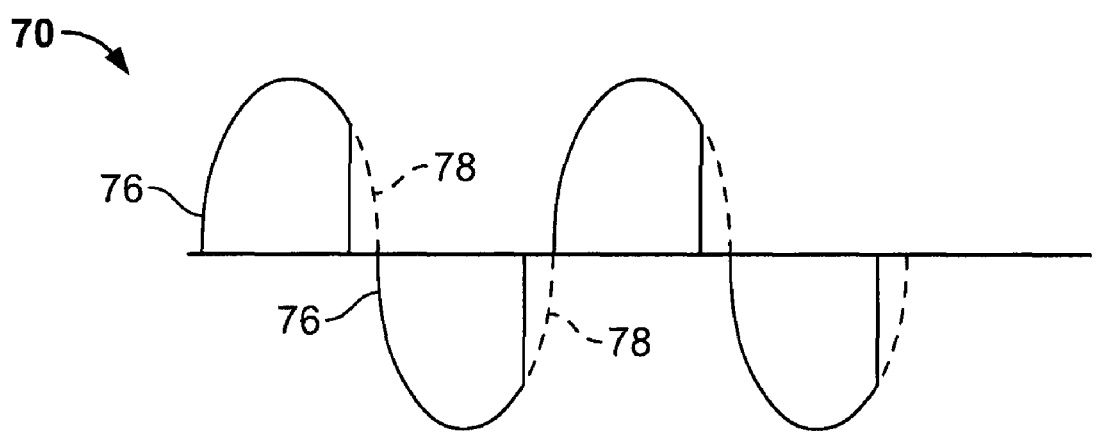
FIG. 9 illustrates a duty cycle for a heating element according to an embodiment of the present invention.

FIGS. 8 and 9 illustrate examples of duty cycles 68 and 70 for a heating element 18 according to an embodiment of the present invention. Referring to FIGS. 1-2, and 8-9, by using a semiconductor switch, such as a triac, as the power switch 38, the processing unit 34 may also be operated in proportional mode. When operated in proportional mode, the switch 38 may activate for only a portion of the cycle of the AC current.

The heating element 18 may be activated for only a portion of the AC power cycle of the power provided by the power source 40. For example, the switch 38, such as a triac, may turn on for only 25% of the power cycle. As another example, the switch 38 may turn on for 50% of the power cycle. Proportional mode operation allows the heat output of the heating element 18 to be controlled. FIGS. 8 and 9 illustrate the heating element 18 being activated using switch 38, including a triac, for different portions of the power cycle.

FIG. 8 illustrates the duty cycle 68 for the heating element 18. More particularly, FIG. 8 illustrates a 10% duty cycle. The solid line portions 72 of the waveform indicate the portions of the power cycle over which the heating element 18 may be activated. The dashed line portions 74 of the waveform indicate the portions of the power cycle over which the heating element 18 may be deactivated.

FIG. 9 illustrates the duty cycle 70 for the heating element 18. More particularly, FIG. 9 illustrates a 75% duty cycle. The solid line portions 76 of the waveform indicate the portions of the power cycle over which the heating element 18 may be activated. The dashed line portions 78 of the waveform indicate the portions of the power cycle over which the heating element 18 may be deactivated.

In certain embodiments, proportional control may be achieved by activating and deactivating the heating element 18 in multiples of whole wavelengths of the AC power. For example, in order to achieve a 50% duty cycle, the heating element 18 may be activated every other cycle. Thus, instead of activating the heating element 18, for example, 10% of the power cycle to achieve a 10% duty cycle, the heating element 18 may be activated for one whole wavelength and deactivated for nine wavelengths to achieve a similar effect. This mode of proportional operation may be advantageous because of the relatively high currents that may be involved to operate the heating element 18. When the heating element 18 is activated and/or deactivated at the nodes of the power cycle (e.g., at whole or half wavelength intervals), large transients that can cause, for example, radio interference, may be avoided.

As more heat is required for fluid within the fluid receptacle, the switch 38 (such as a triac) will be active for more of the cycle, such as shown in FIG. 9. The net effect is proportional control of the heat output. Thus, the temperature of the fluid may be maintained close to a set point. Alternatively, the processing unit 34 may operate a relay within the switch 38 to selectively turn on/off the power to the heating element 18.

In addition to more accurately controlling the heating cycle, the processing unit 34 allows for inputs relating to over-temperature conditions. For example, additional temperature sensor(s) may monitor the heating element 18 in order to terminate the power supply to the heating element 18 if it overheats. Additionally, the system 10 may include sensor(s) that are configured to prevent the heating element 18 from activating at all unless water is present, as discussed above. For example, United States Patent Application Publication 2006/0096971, which is hereby incorporated by reference in its entirety, describes a sensing unit configured to detect a change in at least one of capacitance and resistivity based on fluid changes in order to deactivate a heating element.

Figure 10:
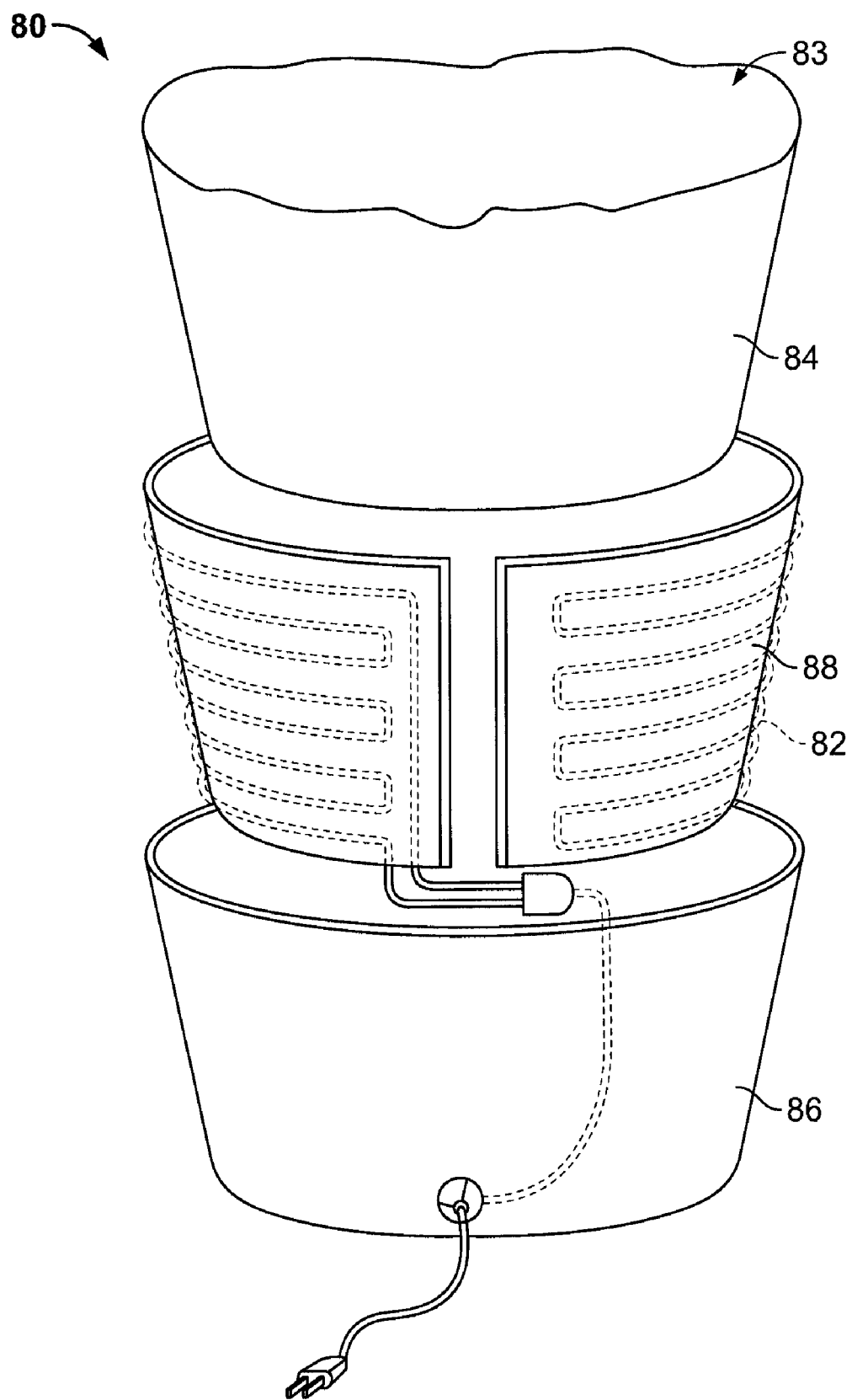
FIG. 10 illustrates a partial perspective exploded view of a heated receptacle, or bucket, according to an embodiment of the present invention.

FIG. 10 illustrates a partial perspective exploded view of a heated receptacle 80, or bucket, according to an embodiment of the present invention. The heated receptacle 80 may include a heating element 82 embedded or secured within respect to a vessel including a fluid receptacle 84 defining a fluid reservoir 83. As a side note, the system 10 shown and described with respect to FIG. 1 may be positioned within a fluid reservoir of a fluid receptacle such as fluid receptacle 84.

The vessel may include a double walled sidewall including the fluid receptacle 84 and an outer bucket 86. A heater, such as a foil heater, including the heating element 82, may be mounted between the inner and fluid receptacle 84 and the outer bucket 86 in order to heat water within the reservoir 83.

While the heating element 82 is shown embedded between the fluid receptacle 84 and the outer bucket 86, embodiments of the present invention may alternatively include a heating element or device that is secured to an outer surface of one of the fluid receptacle 84 or the outer bucket 86. Additionally, embodiments of the present invention may include a heating element or device that may be positioned within the reservoir 83, such as the system 10 shown and described with respect to FIG. 1.

Figure 11:
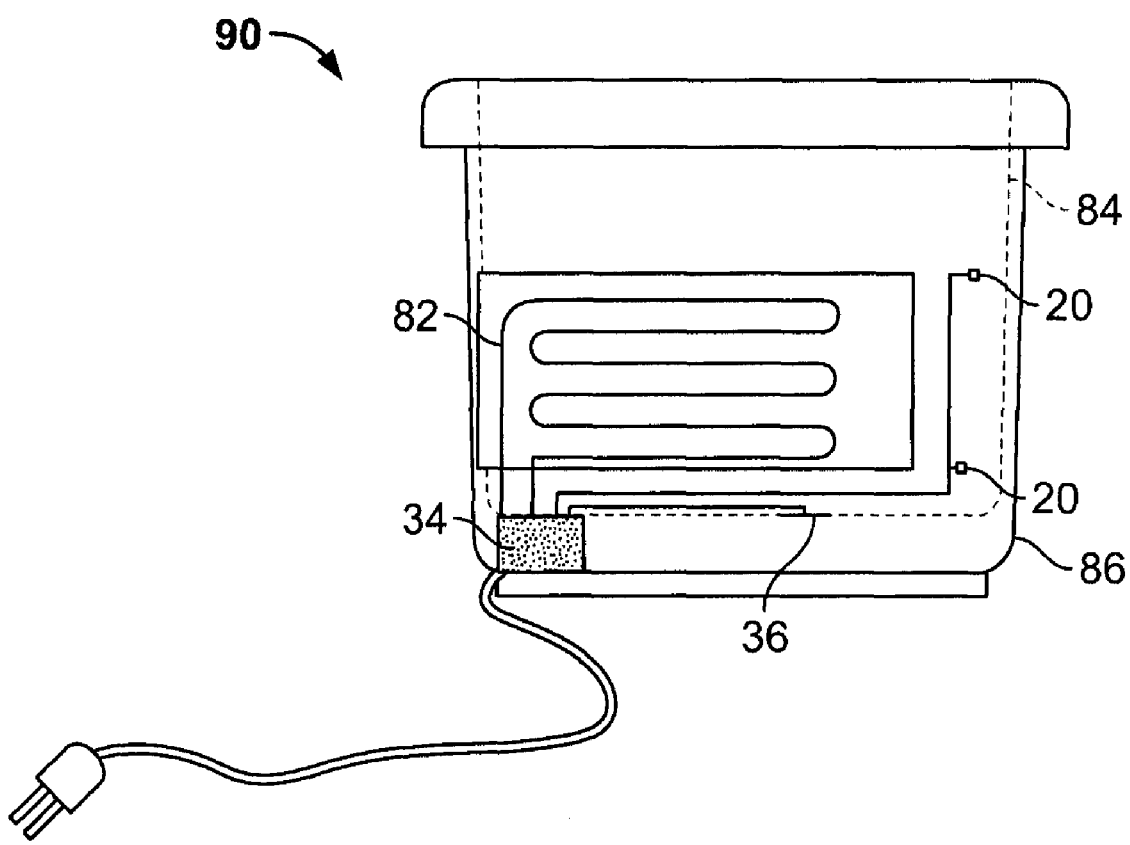
FIG. 11 illustrates a side view of a fluid receptacle heating system according to an embodiment of the present invention.

FIG. 11 illustrates a side view of a fluid receptacle heating system 90 according to an embodiment of the present invention. The system 90 includes the fluid receptacle 84, the outer bucket 86, and the heating element 82 secured between the fluid receptacle 84 and the outer bucket 86. The processing unit 34 described with respect to FIG. 2 is operatively connected to the heating element 82, such as a heater coil, temperature sensors 20 and a fluid sensor 36. The processing unit 34 may also be operatively connected to adjustment buttons, such as buttons 28 and 30 shown in FIG. 1, and a temperature readout screen, such as screen 32 shown in FIG. 1.

The processing unit 34 operates to control the temperature of fluid, such as water, within the fluid receptacle 84 as described above, except that the processing unit 34, switch (not shown in FIG. 11) and the like are incorporated directly into the vessel structure, as opposed to being a separate device that is positioned within a reservoir of the fluid receptacle 84.

The temperature sensors 20 are located on outer surfaces of either the fluid receptacle 84 or the outer bucket 86. The temperature sensors 20 detect the temperature of the fluid receptacle 84 and/or the outer bucket 86, which varies depending on the temperature of the fluid within the fluid receptacle 84.

In the embodiments shown and described in FIGS. 1-2, and 11, the processing unit 34 may activate the heating element 18 and 82 using a solid state device or a switching relay, as described above. While a triac allows proportional control of the heating element 18 or 82 by restricting current flow, as opposed to simply allowing or preventing current flow, a relay or latching relay may be used to provide simpler control.

Figure 12:
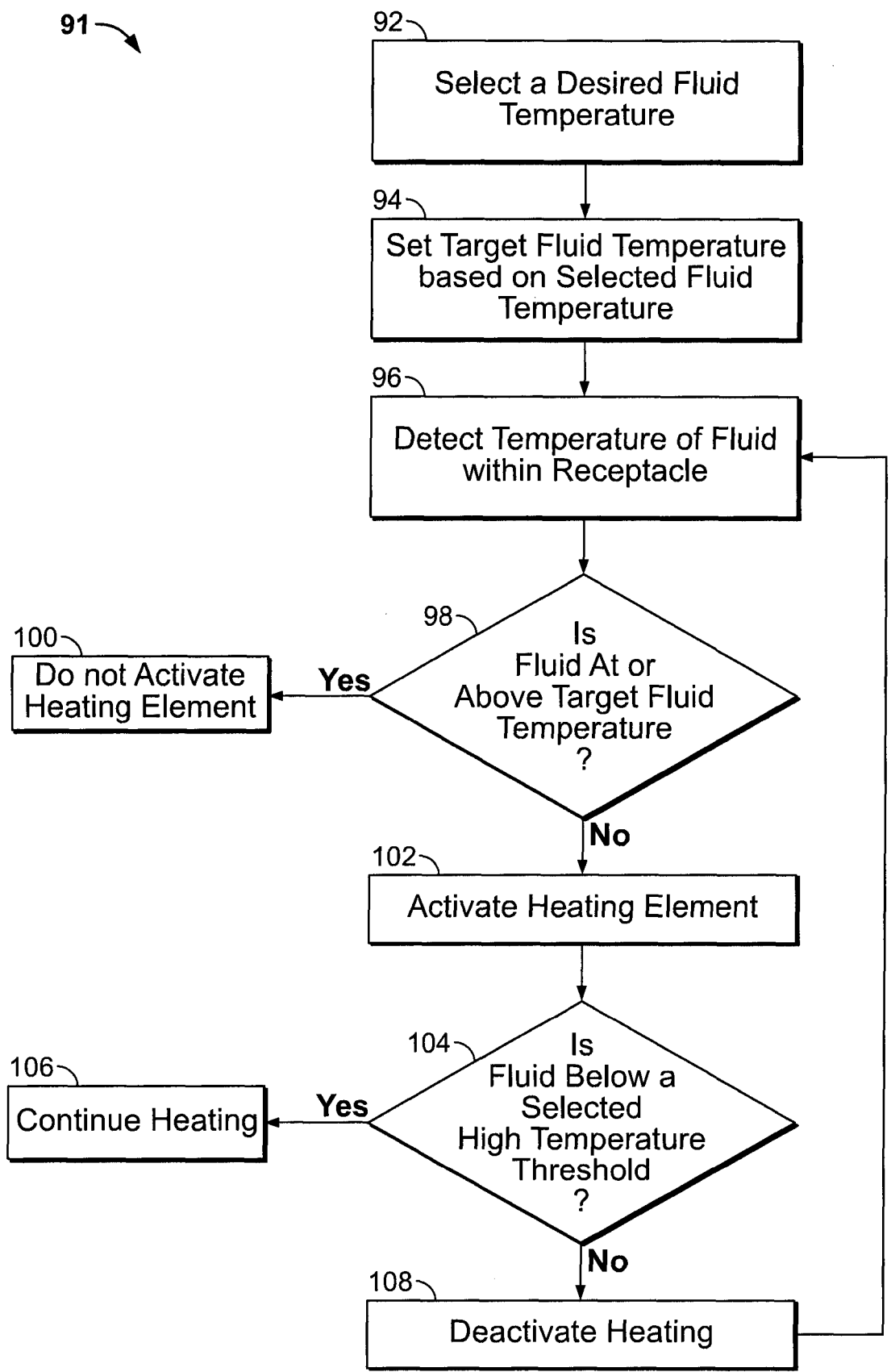
FIG. 12 illustrates a flow chart of a method of controlling a heating element of a water receptacle according to an embodiment of the present invention.

FIG. 12 illustrates a flow chart 91 of a method of controlling a heating element of a water receptacle according to an embodiment of the present invention. At 92, an operator selects a desired fluid temperature for fluid within a fluid receptacle through adjustment buttons that are operatively connected to a processing unit. The operator may be guided through the process of selecting activation and deactivation temperatures through the message displayed by the processing unit on the readout screen. Once the operator selects the desired fluid temperature(s), the processing unit sets the target fluid temperature(s) based on the selected fluid temperature(s) at 94.

At 96, the temperature of fluid, such as water within a water receptacle, is detected, such as through the temperature sensor(s) discussed above. The temperature of the fluid may be displayed on the readout screen. At 98, the processing unit determines whether the fluid within the receptacle is at or above the target temperature. If the temperature of the fluid is at or above the target temperature, then, at 100, the processing unit does not activate the heating element. If, however, the detected temperature is below the target temperature threshold, then the processing unit activates the heating element at 102.

The temperature sensor(s) continue to monitor the temperature of the fluid within the fluid receptacle. The processing unit determines whether the temperature of the fluid is below another temperature threshold at 104, which was selected by the operator. If the temperature of the fluid is below this threshold, the heating element continues to heat the fluid at 106. If, however, the temperature of the fluid is above this threshold, the heating element may deactivate at 108, and the entire process repeats.

Thus, embodiments of the present invention provide a safe and efficient system and method of heating fluid within a fluid receptacle, such as a bucket.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A fluid heating system configured to regulate a temperature of a fluid within a fluid reservoir of a fluid receptacle, the system comprising:

a processing unit;

at least one fluid temperature sensor in electrical communication with said processing unit, said at least one fluid temperature sensor configured to detect a temperature of one or both of the fluid receptacle and/or fluid retained within the fluid receptacle;

a heating element in electrical communication with said processing unit, said heating element configured to heat one or both of the fluid receptacle and/or fluid retained within the fluid receptacle, said processing unit selectively activating and deactivating said heating element to regulate the temperature of the fluid within the fluid receptacle;

an adjustment member in electrical communication with said processing unit, said adjustment member configured to allow an input of a desired fluid temperature, wherein said processing unit selectively activates and deactivates said heating element based on the input desired fluid temperature; and one or both of: at least one heating element temperature sensor in communication with said processing unit, wherein said processing unit is configured to prevent said heating element from activating based on a temperature of said heating element, and/or at least one fluid level sensor in communication with said processing unit, wherein said processing unit is configured to prevent said heating element from activating based on a fluid level within the fluid reservoir.

2. The system of claim 1, further comprising a readout screen in electrical communication with said processing unit, said processing unit operable to display the temperature of the fluid on said readout screen.

3. The system of claim 1, further comprising a switch disposed between said processing unit and said heating element, said processing unit operable to selectively activate and deactivate said heating element through said switch.

4. The system of claim 3, wherein said switch comprises one or more of a triac and/or a relay.

5. The system of claim 1, further comprising a guard sleeve disposed around at least a portion of said heating element.

6. The system of claim 1, wherein said at least one fluid temperature sensor comprises a plurality of fluid temperature sensors disposed along or proximate a length of said heating element, said plurality of fluid temperature sensors configured to detect temperature gradients within the fluid receptacle and/or the fluid retained within the fluid receptacle.

7. The system of claim 1, wherein said heating element is configured to be positioned within the fluid reservoir.

8. The system of claim 1, wherein said heating element and said processing unit are secured to or within said fluid receptacle, and wherein said heating element surrounds at least a portion of said fluid receptacle.

9. The system of claim 1, wherein said heating element comprises a heating coil.

10. The system of claim 1, wherein said processing unit is configured to activate said heating element in a proportional mode.

11. A water heating system comprising:
- a water receptacle having a water reservoir configured to retain water; and
- a water temperature regulating sub-system comprising:
  - a processing unit;
  - at least one water temperature sensor in electrical communication with said processing unit, said at least one water temperature sensor configured to detect a temperature of one or both of the water receptacle and/or water retained within the water reservoir;
  - a heating element in electrical communication with said processing unit, said heating element configured to heat one or more of the said water receptacle and/or the water retained within said water receptacle, said processing unit selectively activating and deactivating said heating element to regulate the temperature of the water within the fluid receptacle;
  - an adjustment member in electrical communication with said processing unit, said adjustment member configured to allow an input of a desired water temperature, wherein said processing unit selectively activates and deactivates said heating element based on the input desired water temperature;
  - a readout screen in electrical communication with said processing unit, said processing unit operable to display the temperature of the water retained within said water reservoir on said readout screen; and
  - one or both of: at least one heating element temperature sensor in communication with said processing unit, wherein said processing unit is configured to prevent said heating element from activating based on a temperature of said heating element, and/or at least one fluid level sensor in communication with said processing unit, wherein said processing unit is configured to prevent said heating element from activating based on a fluid level within the fluid reservoir.

12. The system of claim 11, wherein said water temperature regulating sub-system further comprises a switch disposed between said processing unit and said heating element, said processing unit operable to selectively activate and deactivate said heating element through said switch.

13. The system of claim 11, wherein said water temperature regulating sub-system further comprises a guard sleeve disposed around at least a portion of said heating element.

14. The system of claim 11, wherein said at least one water temperature sensor comprises a plurality of water temperature sensors disposed along or proximate a length of said heating element, said plurality of water temperature sensors configured to detect temperature gradients within the water receptacle and/or water retained within the water reservoir.

15. The system of claim 1, wherein said heating element is configured to be positioned within the water reservoir.

16. The system of claim 1, wherein said temperature regulating sub-system is incorporated into said water receptacle, and wherein said heating element surrounds at least a portion of said water receptacle.

17. A water heating system configured to regulate a temperature of water within a water reservoir of a water receptacle, the system comprising:
- a processing unit;
- a plurality of water temperature sensors in electrical communication with said processing unit, said plurality of water temperature sensors configured to detect a temperature of one or both of the fluid receptacle and/or water retained within the fluid receptacle, said plurality of water temperature sensors disposed along or proximate a length of said heating element, said plurality of water temperature sensors configured to detect temperature gradients within the water receptacle and/or the water retained within the water receptacle;
- a heating element in electrical communication with said processing unit, said heating element configured to heat one or more of the water receptacle and/or water retained within the water receptacle, said processing unit selectively activating and deactivating said heating element to regulate the temperature of the water within the fluid receptacle;
- a semiconductor switch disposed between said processing unit and said heating element, said processing unit operable to selectively activate and deactivate said heating element through said semiconductor switch
- an adjustment member in electrical communication with said processing unit, said adjustment member configured to allow an input of a desired water temperature, wherein said processing unit selectively activates and deactivates said heating element based on the input desired water temperature;
- a readout screen in electrical communication with said processing unit, said processing unit operable to display the temperature of the water on said readout screen; and
- at least one heating element temperature sensor in communication with said processing unit, wherein said processing unit is configured to prevent said heating element from activating based on a temperature of said heating element.

18. The system of claim 17, wherein said heating element is configured to be positioned within the water reservoir.

19. The system of claim 17, wherein said heating element and said processing unit are incorporate into said water receptacle, and wherein said heating element surrounds at least a portion of said water receptacle.

20. The system of claim 1, further comprising:
- at least one water level sensor in communication with said processing unit, wherein said processing unit is configured to prevent said heating element from activating based on a water level within the water reservoir.

21. The system of claim 1, wherein said at least one fluid temperature sensor is configured to detect temperatures of both the fluid receptacle and the fluid retained within the fluid receptacle.

22. A fluid heating system configured to regulate a temperature of a fluid within a fluid reservoir of a fluid receptacle, the system comprising:
- a processing unit;
- at least one fluid temperature sensor in electrical communication with said processing unit;
- a heating element in electrical communication with said processing unit, said heating element configured to heat one or both of the fluid receptacle and/or fluid retained within the fluid receptacle;
- one or both of: at least one heating element temperature sensor in communication with said processing unit, wherein said processing unit is configured to prevent said heating element from activating based on a temperature of said heating element, and/or at least one fluid level sensor in communication with said processing unit, wherein said processing unit is configured to prevent said heating element from activating based on a fluid level within the fluid reservoir.

23. The system of claim 22, wherein said at least one fluid temperature sensor is configured to detect temperatures of both the fluid receptacle and the fluid retained within the fluid receptacle.

* * * * *